US009916270B2

(12) United States Patent
Richardson (10) Patent No.: US 9,916,270 B2
(45) Date of Patent: Mar. 13, 2018

(54) VIRTUAL INTELLIGENT PLATFORM MANAGEMENT INTERFACE (IPMI) SATELLITE CONTROLLER AND METHOD (71) Applicant: Intel Corporation, Santa Clara, CA (US)

(72) Inventor: David R. Richardson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 14/671,321

(22) Filed: Mar. 27, 2015

(65) Prior Publication Data
US 2016/0283424 A1 Sep. 29, 2016

(51) Int. Cl.
*G06F 13/38* (2006.01)
*G06F 13/12* (2006.01)
*G06F 13/40* (2006.01)
*G06F 13/00* (2006.01)
*G06F 13/362* (2006.01)
*G06F 13/42* (2006.01)
*G06F 11/30* (2006.01)

(52) U.S. Cl.
CPC .......... *G06F 13/362* (2013.01); *G06F 11/301* (2013.01); *G06F 11/3031* (2013.01); *G06F 11/3058* (2013.01); *G06F 13/4282* (2013.01)

(58) Field of Classification Search
None
See application file for complete search history.

(56) References Cited

U.S. PATENT DOCUMENTS

| 2004/0228063 | A1 | 11/2004 | Hawkins et al. |
| 2007/0255430 | A1* | 11/2007 | Sharma ............... G05B 9/03 700/20 |
| 2012/0151007 | A1 | 6/2012 | Mescher et al. |
| 2013/0289926 | A1* | 10/2013 | Maity ............... G06F 9/45533 702/130 |

(Continued)

FOREIGN PATENT DOCUMENTS

CN 106020938 A 10/2016

OTHER PUBLICATIONS

"European Application Serial No. 16154728.6, Response filed Mar. 28, 2017 to Extended European Search Report dated Nov. 9, 2016", 5 pgs.

(Continued)

*Primary Examiner* — David E Martinez
(74) *Attorney, Agent, or Firm* — Schwegman Lundberg & Woessner, P.A.

(57) ABSTRACT

Devices and techniques for implementing virtual system management controllers are described herein. A baseboard management controller (BMC) can include processing circuitry to monitor system sensors, and to provide monitoring information for system sensors responsive to requests for monitoring information. The processing circuitry may further implement a virtual satellite controller within a firmware stack. The BMC and the virtual satellite controller may comply with a specification of the Intelligent Platform Management Interface (IPMI) family of specifications to provide monitoring information for the system sensors. Other embodiments are also described.

7 Claims, 4 Drawing Sheets (56) References Cited

U.S. PATENT DOCUMENTS

| | | | | |
|---|---|---|---|---|
| 2014/0280837 A1* | 9/2014 | Ayanam | ................... | H04L 41/24 |
| | | | | 709/223 |
| 2014/0280947 A1* | 9/2014 | Christopher | ............ | H04L 41/08 |
| | | | | 709/226 |
| 2014/0365641 A1* | 12/2014 | Cho | .................... | G06F 13/4022 |
| | | | | 709/224 |
| 2016/0248619 A1* | 8/2016 | Itkin | ..................... | H04L 43/028 |

OTHER PUBLICATIONS

"European Application Serial No. 16154728.6, Extended European Search Report dated Nov. 9, 2016", 16 pgs.

\* cited by examiner

| Controller ID | Logical Unit Number (LUN) | Sensor Information |
|---|---|---|
| 1 | 0 ⋮ | xxxxxxx |
| 1 | 255 | xxxxxxx |
| 2 | 0 ⋮ | xxxxxxx |
| 2 | 255 | xxxxxxx |
| 3 | 0 ⋮ | xxxxxxx |
| 3 | 255 | xxxxxxx |
| 4 | 0 ⋮ | xxxxxxx |
| 4 | 255 | xxxxxxx |

VIRTUAL INTELLIGENT PLATFORM MANAGEMENT INTERFACE (IPMI) SATELLITE CONTROLLER AND METHOD

TECHNICAL FIELD

Embodiments described generally herein relate to server management, and more specifically to baseboard management controllers for server management. Some embodiments relate to the Intelligent Platform Management Interface (IPMI) protocol.

BACKGROUND

Some server systems include a Baseboard Management Controller (BMC), to help manage sensors or other devices within the server system. As server systems become more complex, ever-increasing numbers of sensors or other devices may be used. However, due to backward-compatibility limitations, a BMC can manage only a limited number of sensors. Satellite controllers can be added, but these come at a cost in both money and space. Ongoing efforts are directed to increasing the number of sensors that can be managed by a minimum number of BMCs or satellite controllers in highly complex server systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
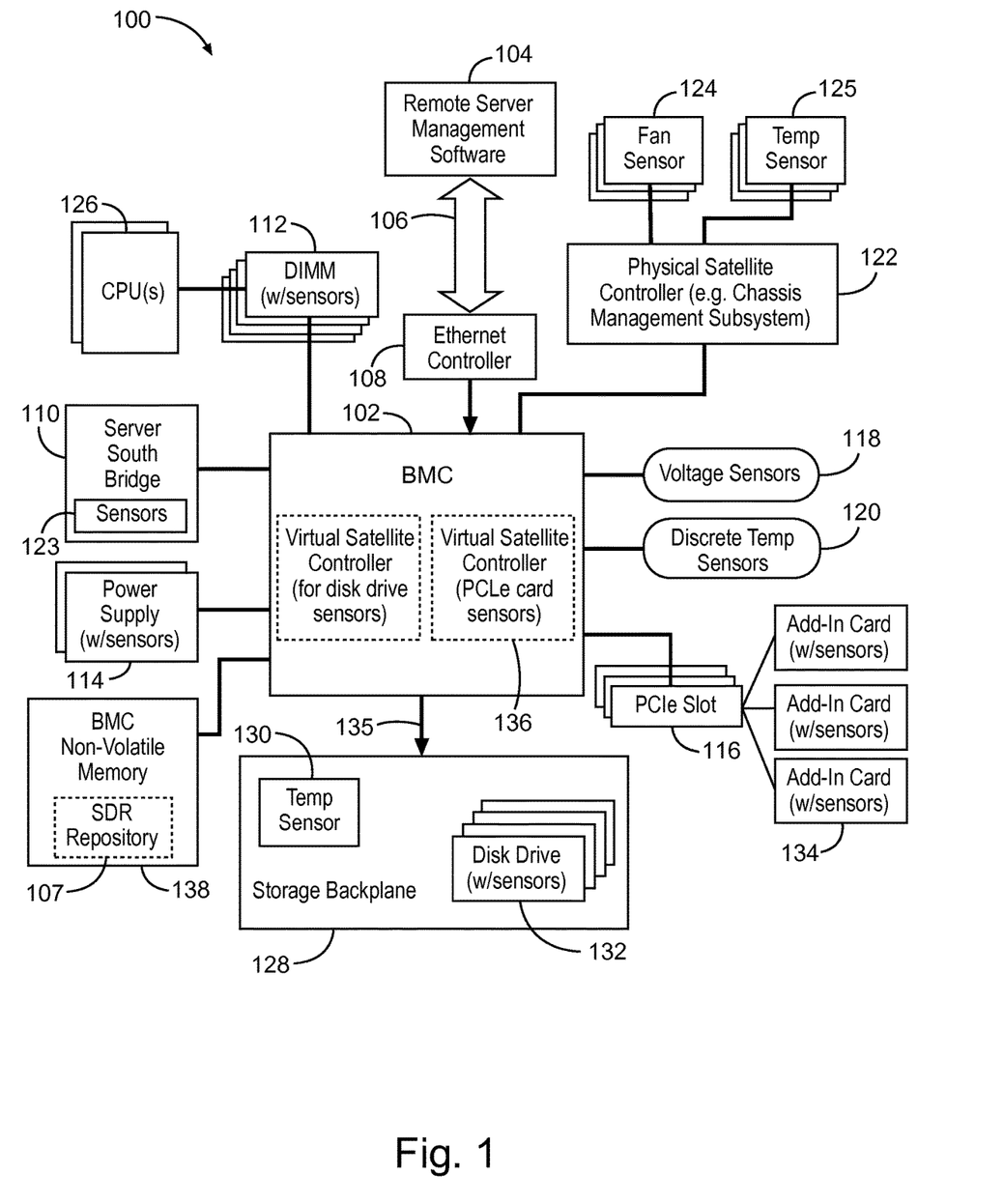
FIG. 1 is a block diagram of an example system management architecture in a server computer system.

FIG. 1 is a block diagram of an example system management architecture in a server system 100. A server system 100 provides a high degree of performance in communications with other computer systems over a communications network.

A baseboard management controller (BMC) 102 controls system management functions in the server system 100. The BMC 102 can be included in the server system 100 in the form of an on-board controller or an add-on card, for example. The BMC 102 monitors a state of the hardware of the server system 100 through monitoring system sensors, among other hardware, using a standard protocol called Intelligent Platform Management Interface (IPMI). However, embodiments are not necessarily limited to IPMI compliance. The BMC 102 interacts with remote server management software 104 over an interface, such as the Local Area Network (LAN) 106, using, for example, an Ethernet controller 108. BMC 102 can provide a hardware/software interface so that system management routines customized for each software interface can execute on a wide variety of platforms.

BMC 102 can communicate with the internal modules (for example Southbridge 110, dual in-line memory modules (DIMMs) 112, power supply 114, Peripheral Component Interconnect Express (PCIe) slots 116) using a private I²C bus or Intelligent Platform Management Bus (IPMB) bus. The server system 100 further includes a plurality of system sensors, with which the BMC 102 communicates either directly or indirectly. For example, PCIe slots 116 may in turn connect with add-in cards 134 and associated sensors, and sensors 123 correspond to Southbridge 110, for example. The BMC 102 may also interface with other types of sensors such as voltage sensors 118 and discrete temperature sensors 120, using the private I²C bus or IPMB.

Furthermore, IPMI provides support for the extension of platform management by connecting additional management controllers to the system using the private I²C bus or IPMB. This provides a standardized way of integrating chassis features with the baseboard. Because the additional management controllers are typically distributed on other boards within the system, physically away from the central BMC (e.g., BMC 102), these additional management controllers are sometimes referred to as satellite controllers, and will be referred to herein as "physical" satellite controllers 122.

Hereinafter, the term "physical satellite controllers" will be understood to refer to controllers that are not incorporated on a same processor as the BMC 102. Unlike virtual satellite controllers 136, a physical satellite controller 122 does not execute in a firmware stack of the BMC 102. It will be appreciated that not all embodiments will include physical satellite controllers 122 and therefore the BMC 102, in some embodiments, will not include communication connections to any physical satellite controllers 122. If physical satellite controllers 122 are included, they may communicate with other sensors, or components of a chassis management subsystem, such as fan sensors 124, temperature sensors 125, etc. The BMC 102 may communicate with physical satellite controllers 122 (e.g., a chassis management subsystem) using a private I²C bus or the IPMB).

The BMC 102 may also communicate with one or more storage backplanes 128 over a private I²C bus 135, and the storage backplane 128 may include other sensors or devices such as storage backplane temperature sensors 130 and disk drives 132 with associated sensors.

The IPMI specification defines a model for system sensor definition and a protocol by which server management software 104 can access sensor data via communication with the BMC 102 over a network or host-based interface. According to the IPMI specification, server management software 104 and other systems reference sensors using an 8-bit sensor number. This sensor number, along with an 8-bit controller identifier, and a Logical Unit Number (LUN) fully identifies a given system sensor. As server systems continue to become more complex and more system devices (e.g. add-in cards 134, Ethernet controllers 108, etc.) are adding support for out-of-band BMC 102 access to sensor data, the number of sensors managed by the BMC 102 can very well exceed the number of sensors identifiable by an 8-bit number. The LUN numbering system provides a way to expand the available number of IPMI sensors owned by a given IPMI controller (e.g., the BMC 102 or physical satellite controllers 122 (if the system includes physical satellite controllers 122, which is not a requirement)) beyond this 8-bit constraint (e.g., integers in the range of 0-255), of the IPMI sensor number field. However, use of expanded numbers beyond this 8-bit constraint may not be backward compatible with already-existing industry server management software. As a result, using the LUN method to expand beyond the 8-bit sensor number limit may cause unpredictable results in some available systems.

The effective limitation of 255 sensors can be increased by aggregating a large number of similar physical sensors into a single IPMI sensor or forego entirely the monitoring of less-essential physical sensors. However, it may not be desirable to aggregate or forego monitoring in some applications. For example, by aggregating multiple physical sensors into one IPMI sensor, management software applications lose the ability to report the current sensor reading of the individual contributing physical sensors. The result may be a substantial loss in the ability to diagnose existing or potential problems with the server system 100. As an additional example, foregoing monitoring support for less essential sensors can result in a failure to detect a serious problem that could result in server failure and resultant downtime. For example, high heat conditions may go undetected, leading to higher fan speeds and undue power consumption by the server system 100.

Figure 2:
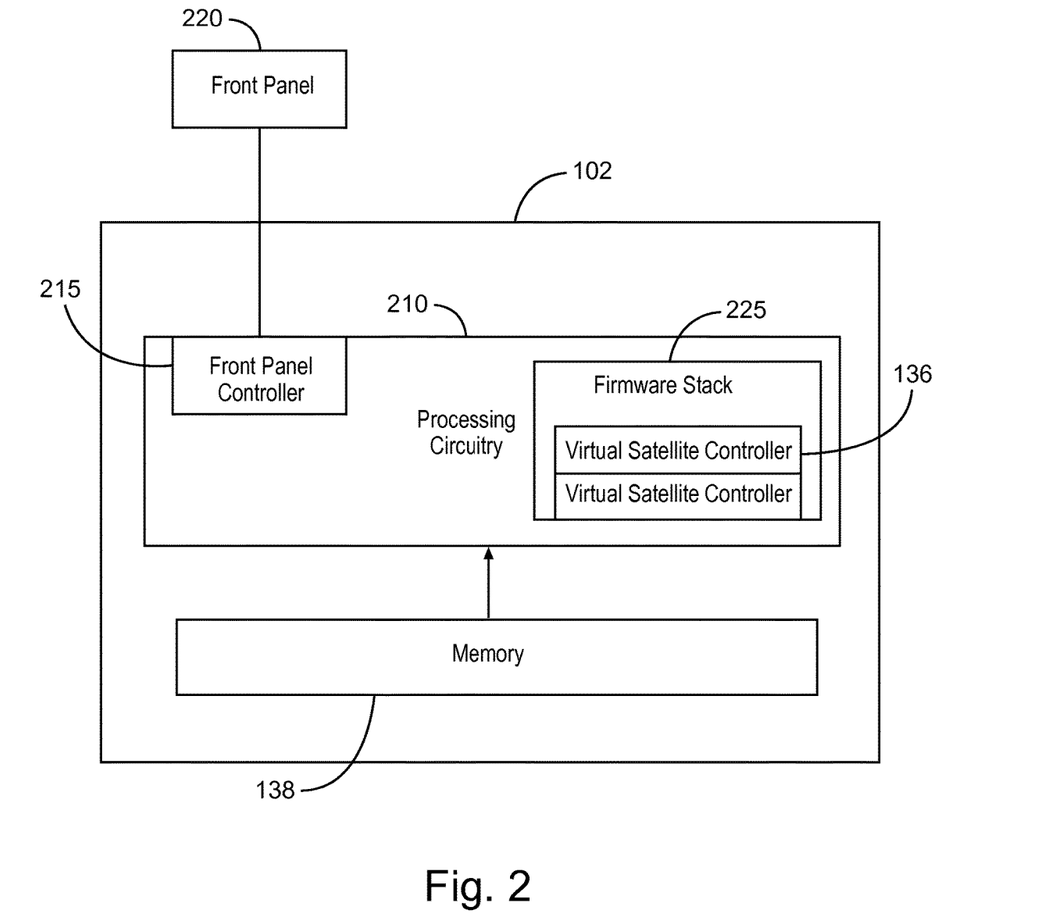
FIG. 2 is a block diagram of a baseboard management controller (BMC) in accordance with some embodiments.

To address these and other concerns, embodiments provide for the BMC 102 to implement one or more virtual satellite controllers 136, in a firmware stack of the BMC 102. FIG. 2 is a block diagram of a BMC 102 for providing solutions in accordance with some embodiments. The BMC 102 illustrated in FIG. 2 can serve as the BMC 102 in the server system 100 (FIG. 1).

As shown in FIG. 2, the BMC 102 includes one or more virtual satellite controllers 136. In these embodiments, the one or more virtual satellite controllers 136 may be implemented in a firmware stack 225 of the BMC 102, although this is not a requirement. From the point of view of remote server management software 104 (FIG. 1) and other commercial software, the virtual satellite controllers 136 would appear as separate controllers with their own controller identifier attached to the BMC 102 via a management bus (e.g., IPMI bus described earlier herein). Because available systems can recognize physical satellite controllers 122 (although it will be appreciated that not all embodiments will necessarily include physical satellite controllers 122), available systems can already handle the use of multiple controller identifiers and therefore no backward-compatibility issues will result from use of methods and apparatuses in accordance with embodiments described herein. Furthermore, through usage of virtual satellite controllers 136, the effective number of sensors managed by a single physical BMC 102 can be expanded well beyond current limitations. For example, a single BMC 102 can effectively manage up to (N×255) sensors, where N is the number of virtual satellite controllers executing in the firmware stack of BMC 102.

Figure 3:
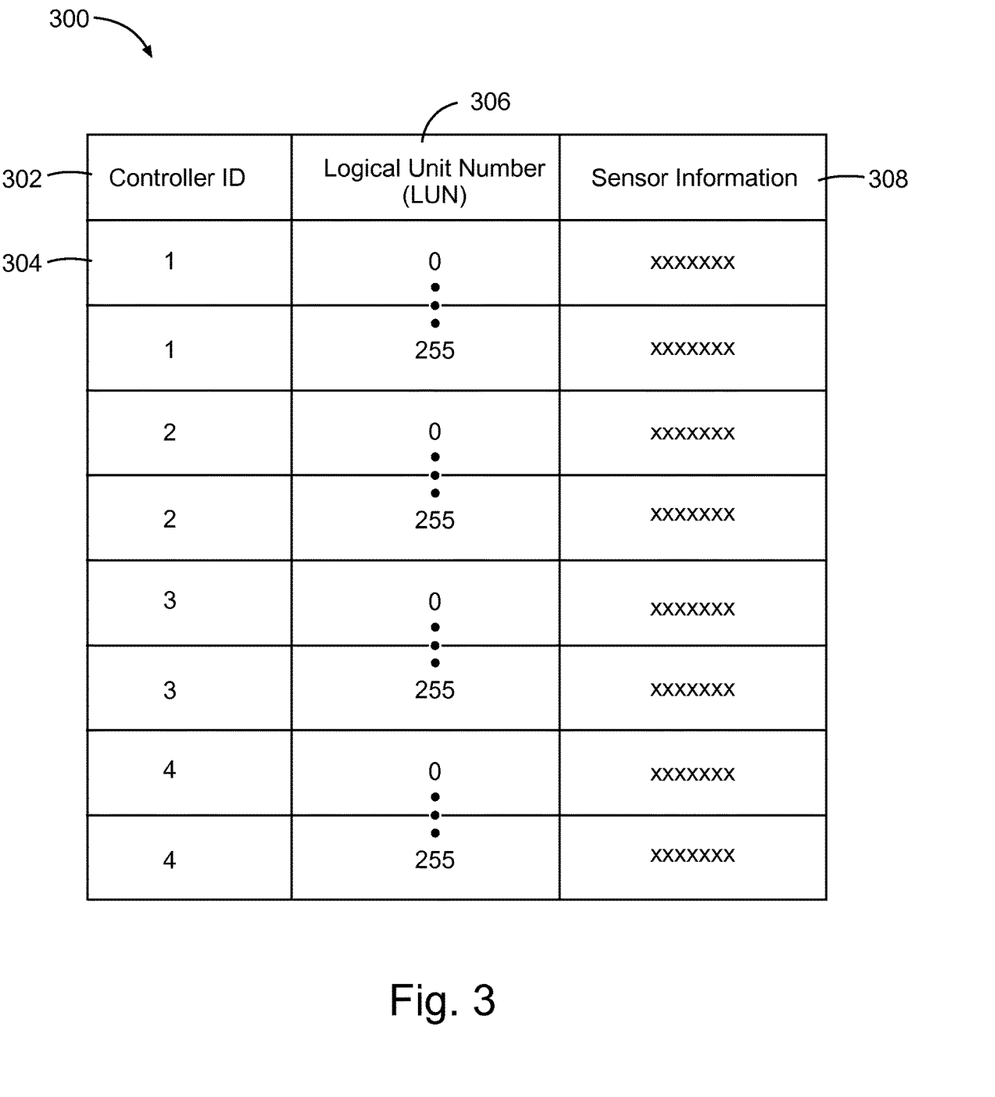
FIG. 3 illustrates an example table of sensor data records (SDRs) in accordance with some embodiments.

The BMC 102 can include or communicate with memory 138 to store sensor data records (SDRs) for all of the various system sensors (e.g., fan sensor 124, temperature sensor 125, voltage sensors 118, discrete temperature sensors 120, add-in card 134 sensors, disk drive 132 sensors, power supply 114 sensors, Southbridge sensors 123, etc., shown in FIG. 1). IPMI specifies requirements for SDRs. FIG. 3 illustrates an example table 300 of SDRs 304 in accordance with some embodiments.

SDRs can include, for example, information 308 obtained from sensors in the server system 100, such as a CPU temperature sensor, a fan speed sensor, a voltage sensor, etc. As described earlier herein, memory 138 can be non-volatile memory. SDRs 304 may be used by external software to discover the IPMI sensor population of a given system, although the scope of the embodiments is not limited in this respect.

At least some SDRs 304 include the corresponding controller identifier 302 to identify which management controller (e.g., the BMC 102, a virtual satellite controller 136, physical satellite controllers 122 (FIG. 1, for embodiments that include physical satellite controllers 122, with the understanding that not all embodiments necessarily include physical satellite controllers 122), etc.) controls (e.g., "owns") that sensor. The combination of the controller identifier 302 and Logical Unit Number 306 indicate the identity of a particular sensor for which the remote server management software 104 (or other external software or systems) can access information 308. In addition to the fields shown in FIG. 3, some other SDRs (not shown in FIG. 3) specify parameters that external software uses to bridge IPMI commands to the specified management controller (e.g., the BMC 102, a virtual satellite controller 136, physical satellite controllers 122 (when present, FIG. 1), etc.) to access corresponding IPMI sensors.

Referring again to FIG. 2, in embodiments, the BMC 102 receives requests (over an interface as described earlier herein with respect to FIG. 1) for system management information from system management software (e.g., remote server management software 104 (FIG. 1) or any other software or user tool). The requests can include IPMI commands or be otherwise compliant with a standard of the IPMI family of standards. The requests can include requests for monitoring information pertaining to sensors, for example sensors related to disk drives, PCIe cards, voltage sensors, temperature sensors, or any other kind of sensor.

In embodiments, the BMC 102 receives controller identifiers 302 (FIG. 3) as part of an IPMI command (for example in a header, wrapper, or metadata field of an IPMI command) received from external software. A controller identifier 302 corresponds to a virtual satellite controller 136 or to a physical satellite controller 122 (FIG. 1, if the system includes physical satellite controllers 122, which is not a requirement). The BMC 102 routes the messages accordingly.

For example, if the remote server management software 104 determines, based on an SDR for a sensor of interest, that the corresponding controller identifier 302 is assigned to a physical satellite controller 122, the remote server management software 104 includes the controller identifier 302 in a standard IPMI command (e.g., Get Sensor Reading, etc.). The BMC 102 provides (by, for example, transmitting) the request for system management to the physical satellite controller 122 (FIG. 1) identified by the controller identifier 302, using an interface as described earlier herein for communicating with physical satellite controllers 122.

If the remote server management software 104 determines (using the SDR of the sensor of interest) that the corresponding controller identifier 302 is assigned to a virtual satellite controller 136, then the remote server management software 104 sends a proxy IPMI command (e.g., an IPMI Send Message Command according to a protocol of the IPMI family of protocols). The proxy IPMI command encapsulates a desired sensor command (e.g., Get Sensor Reading, etc.) The BMC 102 receives this proxy IPMI command, and handle the command internally or cause the message to be handled. For example, in one embodiment, each virtual satellite controller 136 supports an application programming interface (API) that emulates IPMI sensor command responses. Any IPMI commands directed to that virtual satellite controller 136 will generate an IPMI command, formatted according to IPMI standards, responding to the originating external software that sent the command. To the external software, it would appear that the virtual satellite controller 136 was a physically distinct satellite controller responding to the command, and backward compatibility would be maintained since available external software already adequately handles physical satellite controllers. Each virtual satellite controller 136 (as well as the physical satellite controller(s) 122, etc.) would be able to support up to 255 sensors in addition to the possible 255 sensors supported by the BMC 102 itself.

In some embodiments, a virtual satellite controller 136 corresponds to a set of PCIe card 134 sensors, wherein the set of PCIe card 134 sensors includes between 1 and 256 sensors. In some embodiments, a virtual satellite controller 136 corresponds to a set of disk drive 132 sensors, wherein the set of disk drive 132 sensors includes between 1 and 256 sensors. However, it will be understood that virtual satellite controllers 136 may correspond to any type of sensor. For example, a virtual satellite controller 136 may handle all DIMM 112 sensors, or any other sensor or group of sensors, by way of nonlimiting example. In some other examples, two or more virtual satellite controllers 136 may handle a single type or group of sensors, or one virtual satellite controller 136 may handle several types or groups of sensors. Embodiments are not limited to any particular number of virtual satellite controllers 136, and embodiments are not limited in the number or type of sensors that can be handled by any particular virtual satellite controller 136 or group of virtual satellite controllers 136.

In some embodiments, server management software 104 will reside on or execute from CPUs 126 (FIG. 1), in which case the server management software 104 communicates with the BMC 102 via an IPMI-defined host/BMC interface. Furthermore, operators can use available software tools to display the IPMI sensors exposed by the BMC 102. If any displayed controller identifier is different from that of the BMC 102, and there are no other physical satellite controllers 122 on the baseboard (either discrete or embedded in another physical device), then that is an indication of a virtual satellite controller 136 implementation.

The BMC 102 may be implemented using an application-specific integrated circuit (ASIC) although an ASIC is not necessary and the hardware implementing the system management may alternatively consist of several different chips. A BMC 102 ASIC includes a micro-controller silicon core, which includes the functionality of the BMC 102 as well as the functionality of a front panel controller (FPC) 215 to control a front panel 220 and user inputs. The BMC 102 ASIC can further include a power supply controller. A reduced instruction set (RISC) processor (not shown) controls various server management functions, such as the system power/reset control, sensor monitoring, system initialization, fault resilient booting (FRB), etc. Although not shown in FIG. 2, the BMC 102 ASIC also contains a General Purpose Input/Output (GPIO) interface for programmable pins, and Universal Adaptive Receiver/Transmitters (UARTs) to connect to other devices.

The front panel controller 215 for BMC 102 can include user controls for power, reset, Sleep Button operations, or other operations, in addition to indicators for working conditions and faults. A liquid crystal display (LCD) panel (16×2 character size, for example) can provide textual status display as part of the user interface.

The BMC 102 includes multiple I²C bus controllers (not shown in FIG. 2) for connection to an IPMB based on a multi-master, 2-wire, serial I²C bus that interconnects a system baseboard and chassis electronics and provides a communications path for system platform management information between BMC 102 and other elements. One of the I²C bus controllers interfaces BMC 102 with various sensors. Some, but not all, of the sensors are shown in FIG. 1. The BMC 102 (or baseboard on which BMC is mounted) includes sensor monitoring and control circuitry for receiving sensor data and driving control signals to the various sensors. Non-volatile flash memory 138 can additionally store BMC 102 operation code, firmware update code, a system event log (SEL) and BMC 102 persistent data, by way of nonlimiting example.

Although an ASIC can be used in some embodiments, embodiments are not limited thereto and apparatuses and methods of embodiments are applicable for use with computer systems of all types of architecture, including any system that includes hardware for system management. For example, the system management functionality of the BMC 102 need not be performed by a special purpose ASIC but rather by a plurality of separate integrated chips. Conversely, the computer system may be a large computer system containing a plurality of processors, storage units, etc., such as a server complex. Such a large computer system may have a plurality of system management controllers, similar to the BMC 102, either combined or on separate units.

The BMC 102 ASIC may optionally include the functionality of an Intelligent Chassis Management Bridge (ICMB) controller for managing chassis-to-chassis bus interconnections (i.e., for connecting together the management systems of a plurality of computers in a server system 100) or a hot swap controller (HSC). At least one physical satellite controller 122 can reside in a separate chassis from the BMC 102. Of course, a wide variety of implementations, arrangements, and configurations may be used, and embodiments are not limited to any particular implementation, arrangement, or configuration.

Figure 4:
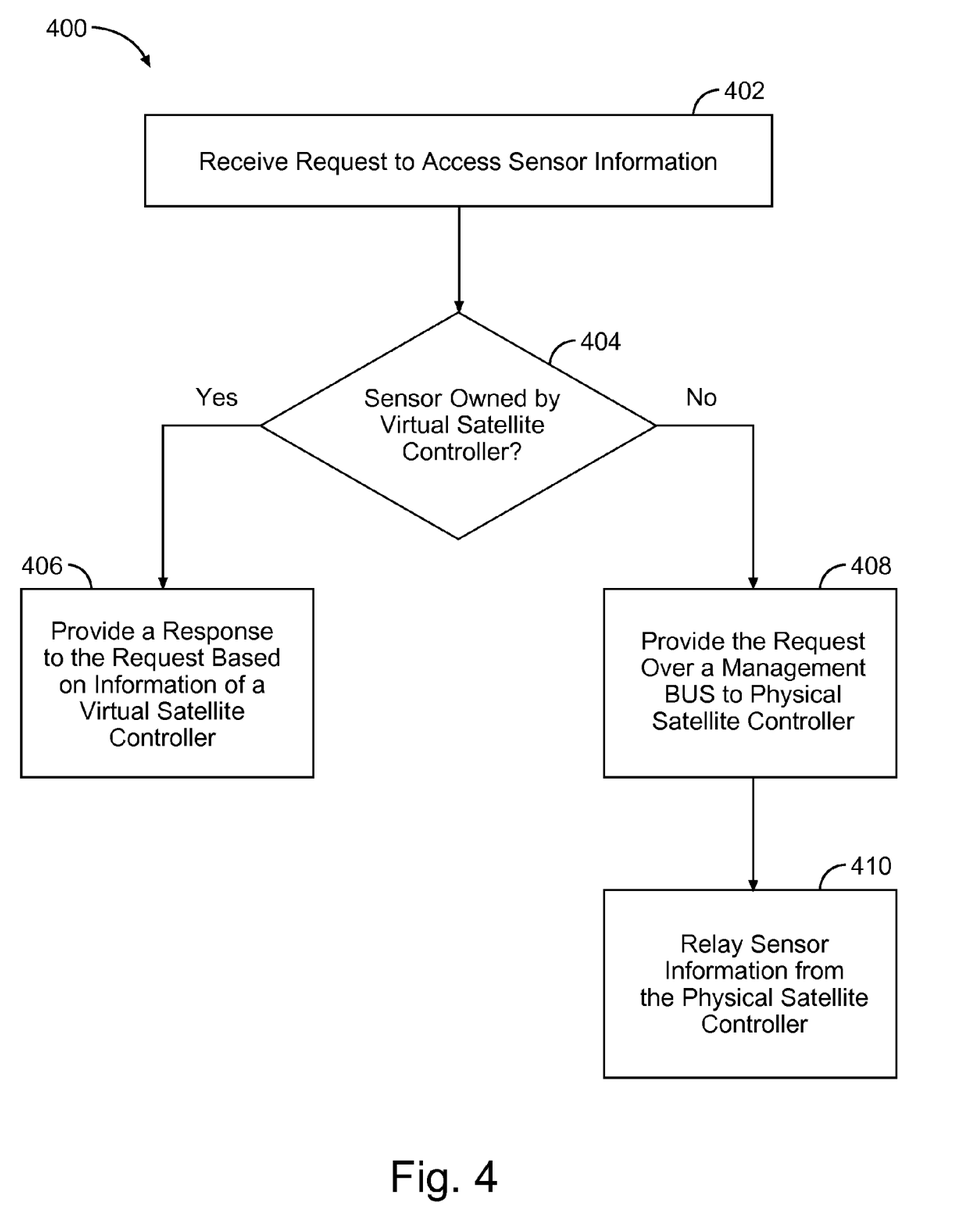
FIG. 4 illustrates a flow chart of an example hardware-implemented method in accordance with some embodiments.

FIG. 4 illustrates a flow chart of an example hardware-implemented method 400 in accordance with some embodiments. The BMC 102 (FIGS. 1 and 2) can implement some operations of example method 400.

The example method 400 begins with operation 402 with the BMC 102 receiving a request to access sensor information for a system sensor. As described earlier herein, the system sensor can be one of various sensors (e.g., fan sensor 124, temperature sensor 125, voltage sensors 118, discrete temperature sensors 120, add-in card 134 sensors, disk drive 132 sensors, power supply 114 sensors, Southbridge sensors 123, etc.) shown in FIG. 1, although embodiments are not limited to only the sensors shown in FIG. 1. As described earlier herein with reference to FIG. 2, the request includes identification information (e.g., controller identifier 302 (FIG. 3)) of a controller that corresponds to the system sensor for which the request is being made. As described earlier herein, the request can be in accordance with a specification of an IPMI family of specifications, although embodiments are not limited thereto.

The example method 400 continues with operation 404 with the BMC 102 determining, based on the identification information, whether the request is to be directed to a virtual satellite controller 136 or physical satellite controller 122. In operation 406, if the request is to be directed to a virtual satellite controller 136, executing in a firmware stack 225 of the BMC 102, the BMC 102 provides a response to the request based on information of the virtual satellite controller 136. For example, as described earlier herein, the virtual satellite controller 136 can provide an API command in response to the request, to be provided back to the requesting system or software (e.g., remote server management software 104 (FIG. 1)).

On the other hand, if the request is to be directed to a physical satellite controller 122 (e.g., a satellite controller operating outside the firmware stack 225 of the BMC 102, or on a separate computer or separate chassis as described earlier herein), the BMC 102 provides the request in operation 408 over a management bus. This management bus can include a management bus managed by ICMB as described earlier herein. In operation 410, the BMC 102 will relay sensor information from the physical satellite controller 122, responsive to providing the request or receiving a response to the request, back to a requesting system or requesting software program.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) may be configured by firmware or software (e.g., instructions, an application portion, or an application) as a module that operates to perform specified operations. In an example, the software may reside on at least one machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Any or all of the machines (e.g., computer systems) discussed herein may include a hardware processor (e.g., a central processing unit (CPU), a graphics processing unit (GPU), a hardware processor core, or any combination thereof), a main memory and a static memory, at least some of which may communicate with others via an interlink (e.g., bus). Further, any or all computer systems can include a display unit, an alphanumeric input device (e.g., a keyboard), and a user interface (UI) navigation device (e.g., a mouse). In an example, the display unit, alphanumeric input device and UI navigation device may be a touch screen display.

Any machine may additionally include a storage device (e.g., drive unit), a signal generation device (e.g., a speaker), and one or more sensors such as a global positioning system (GPS) sensor, compass, accelerometer, or other sensor, an output controller such as a serial (e.g., universal serial bus (USB), parallel, or other wired or wireless (e.g., infrared (IR)) connection to communicate or control one or more peripheral devices (e.g., a printer, card reader, etc.).

For example, a storage device of the BMC 102 may include at least one machine-readable medium on which is stored one or more sets of data structures or instructions (e.g., software) embodying or utilized by any one or more of the techniques or functions described herein. The instructions may also reside, at least partially, in additional machine-readable memories such as memory 138, or within processing circuitry 210 during execution thereof by the BMC 102. In an example, one or any combination of the processing circuitry 210, the memory 138, or other storage device of the BMC 102 may constitute machine-readable media.

The term "machine-readable medium" may include a single medium or multiple media (e.g., a centralized or distributed database, and/or associated caches and servers) that configured to store the one or more instructions.

For example, the instructions can cause the BMC 102 to receive a request to access sensor information for a system sensor. As described earlier herein, the request will include identification information of a controller that corresponds to the system sensor for which the request is being made. The instructions can cause the BMC to provide a response to the request based on information of a virtual satellite controller if the identification information corresponds to a virtual satellite controller 136 executing in a firmware stack 225 of the BMC 102.

The term "machine-readable medium" may include any medium that is capable of storing, encoding, or carrying instructions for execution by a machine (e.g., the BMC 102, satellite controllers, etc.) and that cause the machine (e.g., the BMC 102, satellite controllers, etc.) to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The above-described instructions may further be transmitted or received over a communications network using a transmission medium via the network interface device utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1×* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by a machine (e.g., the BMC 102, satellite controllers, etc.), and includes digital or analog communications signals or other intangible medium to facilitate communication of such software.

These example embodiments may utilize a special purpose ASIC (application specific integrated circuit) to provide system management features. However, embodiments are not limited to the example embodiments described in this application or to any other kind of computer system. These example methods may be used in the example computer systems described in this application or in any other computer system having suitable system management.

ADDITIONAL NOTES & EXAMPLES

Example 1 include subject matter (such as a baseboard management controller (BMC), and or any other electrical apparatus or processor) including processing circuitry to monitor system sensors, provide monitoring information for the system sensors, responsive to requests for monitoring information, and implement a virtual satellite controller within a firmware stack, wherein each of the BMC and the virtual satellite controller comply with a specification of the Intelligent Platform Management Interface (IPMI) family of specifications to provide monitoring information for the system sensors.

In Example 2, the subject matter of Example 1 can optionally include wherein the processing circuitry is arranged implement a plurality of virtual satellite controllers within the firmware stack, and wherein each of the plurality of virtual satellite controllers corresponds to a set of between 1 and 256 system sensors.

In Example 3, the subject matter of any of Examples 1-2 can optionally include wherein the processing circuitry is further arranged to communicate with at least one physical satellite controller that does not execute within the firmware stack of the BMC, and wherein the BMC is arranged to provide requests for system management information to the at least one physical satellite controller.

In Example 4, the subject matter of Example 3 can optionally include wherein the BMC communicates to the physical satellite controller via a management bus, and wherein the management bus is managed by an Intelligent Chassis Management Bridge (ICMB) if the physical satellite controller resides outside a chassis in which the BMC resides.

In Example 5, the subject matter of any of Examples 1-4 can optionally include non-volatile memory to store sensor data records (SDRs) for the system sensors, wherein the SDRs include a controller identifier to identify which controller, of the BMC, the plurality of virtual satellite controllers, and the physical satellite controller, corresponds to a respective system sensor, and wherein a request for monitoring information include the controller identifier for the controller corresponding to the system sensor for which the request is being made.

In Example 6, the subject matter of any of Examples 1-5 can optionally include wherein the processing circuitry provides an application programming interface (API) for providing monitoring information.

In Example 7, the subject matter of Example 6 can optionally include wherein the API complies with an Intelligent Platform Management Interface (IPMI) specification.

In Example 8, the subject matter of any of Examples 1-7 can optionally include wherein the processing circuitry is included as part of a special purpose application-specific integrated circuit (ASIC).

In Example 9, the subject matter of Example 8 can optionally include wherein the ASIC further includes a front panel controller to control a front panel and to receive user inputs.

In Example 10, the subject matter of any of Examples 2-9 can optionally include wherein at least one virtual satellite controller corresponds to a set of Peripheral Component Interconnect Express (PCIe) card sensors.

Example 11 includes subject matter including a hardware-implemented method for management (e.g., for implementing a virtual system management controller), the method comprising receiving a request to access sensor information for a system sensor, the request including identification information of a controller that corresponds to the system sensor for which the request is being made; and providing a response to the request based on information of a virtual satellite controller if the identification information corresponds to a virtual satellite controller executing in a firmware stack of the BMC.

In Example 12, the subject matter of Example 11 can optionally include wherein the request is in accordance with a specification of an Intelligent Platform Management Interface (IPMI) family of specifications.

In Example 13, the subject matter of any of Examples 11-12 can optionally include providing the request over a management bus if the identification information corresponds to a physical satellite controller executing outside the firmware stack of the BMC; and relaying sensor information from the physical satellite controller, responsive to providing the request, to a requesting system.

In Example 14, the subject matter of Example 13 can optionally include wherein the management bus is managed by an Intelligent Chassis Management Bridge (ICMB) if the physical satellite controller resides outside a chassis in which the BMC resides.

Example 15 includes subject matter such as a machine-readable medium including instructions that, when executed on a machine (such as a baseboard management controller (BMC), a processor, or other electrical or electronic apparatus) including receiving a request to access sensor information for a system sensor, the request including identification information of a controller that corresponds to the system sensor for which the request is being made; and providing a response to the request based on information of a virtual satellite controller if the identification information corresponds to a virtual satellite controller executing in a firmware stack of the BMC.

In Example 16, the subject matter of Example 15 can optionally include wherein the request is in accordance with a specification of an Intelligent Platform Management Interface (IPMI) family of specifications.

In Example 17, the subject matter of any of Examples 15-16 can optionally include providing the request over a management bus if the identification information corresponds to a physical satellite controller executing outside the firmware stack of the BMC; and relaying sensor information from the physical satellite controller, responsive to providing the request, to a requesting system.

In Example 18, the subject matter of Example 17 can optionally include wherein the management bus is managed by an Intelligent Chassis Management Bridge (ICMB) when the physical satellite controller resides outside a chassis in which the BMC resides.

Example 19 includes subject matter (such as a computer system, server system, data center, or other networked system or system for monitoring a networked system) including a plurality of system sensors; circuitry for executing a baseboard management controller (BMC) and a virtual satellite controller, wherein the virtual satellite controller is implemented in a firmware stack of the BMC, and wherein each of the BMC and the virtual satellite controller comply with a specification of the Intelligent Platform Management Interface (IPMI) family of specifications to provide monitoring information for the plurality of system sensors; and a management tool for requesting monitoring information for the plurality of system sensors from the BMC and for displaying the monitoring information.

In Example 20, the subject matter of Example 19 can optionally include a physical satellite controller, executed on a processor separate from the BMC, wherein the physical satellite controller resides in a separate chassis from the BMC; and a management bus, managed by an Intelligent Chassis Management Bridge (ICMB), to provide communication between the BMC and the physical satellite controller.

In Example 21, the subject matter of any of Examples 19-20 can optionally include wherein the computer system is a server computer system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A baseboard management controller (BMC) comprising:
processing circuitry to
monitor system sensors,
provide monitoring information, in accordance with a specification of the Intelligent Platform Management Interface (IPMI) family of specifications, for the system sensors responsive to requests for monitoring information,
implement a virtual satellite controller within a firmware stack,
implement a plurality of virtual satellite controllers within the firmware stack, and wherein each of the plurality of virtual satellite controllers corresponds to a set of between 1 and 256 system sensors, and
communicate with a physical satellite controller that does not execute within the firmware stack of the BMC, and wherein the BMC is arranged to provide requests for system management information to the physical satellite controller, and
non-volatile memory to store sensor data records (SDRs) for the system sensors, wherein the SDRs include a controller identifier to identify which controller, of the BMC, the plurality of virtual satellite controllers, and the physical satellite controller, corresponds to a respective system sensor, and wherein a request for monitoring information include the controller identifier for the controller corresponding to the system sensor for which the request is being made.

2. The BMC of claim 1, wherein the BMC communicates with the physical satellite controller via a management bus, and wherein the management bus is managed by an Intelligent Chassis Management Bridge (ICMB) if the physical satellite controller resides outside a chassis in which the BMC resides.

3. The BMC of claim 1, wherein the processing circuitry provides an application programming interface (API) for providing monitoring information.

4. The BMC of claim 3, wherein the API complies with an Intelligent Platform Management Interface (IPMI) specification.

5. The BMC of claim 1, wherein the processing circuitry is included as part of a special purpose application-specific integrated circuit (ASIC).

6. The BMC of claim 5, wherein the ASIC further includes a front panel controller to control a front panel and to receive user inputs.

7. The BMC of claim 1, wherein at least one virtual satellite controller of the plurality of virtual satellite controllers corresponds to a set of Peripheral Component Interconnect Express (PCIe) card sensors.

* * * * *